Figure 1:
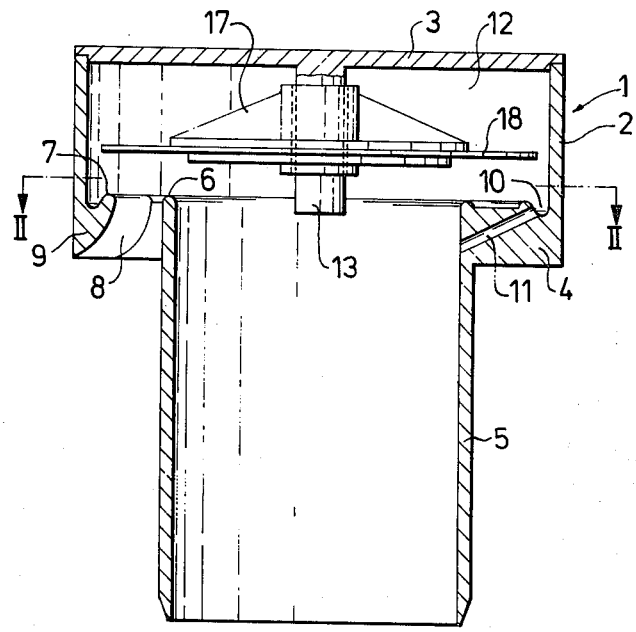

United States Patent [19]

Persson

[11] 4,436,107

[45] Mar. 13, 1984

[54] VENTILATION VALVE

[76] Inventor: Bengt A. Persson, 28B, Corso Italia, CH-6911 Campione D'Italia, Italy

[21] Appl. No.: 59,399

[22] Filed: Jul. 20, 1979

[30] Foreign Application Priority Data

Sep. 12, 1978 [SE] Sweden .............................. 7809583

[51] Int. Cl.³ ............................................ F16K 15/00
[52] U.S. Cl. .................................... 137/314; 137/526
[58] Field of Search ............... 137/217, 503, 510, 526, 137/314

[56] References Cited

U.S. PATENT DOCUMENTS 2,018,130 10/1935 Jauch .................................. 137/503
3,923,081 12/1975 Persson ................................ 137/217

Primary Examiner—Martin P. Schwadron
Attorney, Agent, or Firm—Kinzer, Plyer, Dorn & McEachran

[57] ABSTRACT

In a ventilating valve adapted to be connected to a pipe in which, when the pressure in said pipe is below the ambient pressure, said pressure is equalized by causing ambient air to enter said pipe, said valve comprising an annular valve means, the pressure in a valve chamber communicating with the pipe acting on one side of said valve means while ambient pressure acts on the other side thereof through an inlet opening to the valve chamber, said inlet opening being defined by stays which extend between two seats co-operating with the valve means, there is arranged around the inner wall of the housing of said chamber a liquid collecting groove which is connected by means of one or more channels with the interior of a tubular connecting means for the pipe, and each such channel is arranged in a stay.

2 Claims, 4 Drawing Figures

VENTILATION VALVE

The present invention relates to a ventilation valve adapted to be connected to a pipe in which, when the pressure in said pipe is below the ambient pressure, said pressure is equalised by permitting ambient air to enter into said pipe, said valve comprising an annular valve means of resilient material. The pressure in a valve chamber accommodated in a valve housing and communicating with said pipe acts on one side of said annular valve means while atmospheric pressure acts on the other side of said valve means through an inlet opening to said valve chamber, said other side facing a valve-seat means in the form of two mutually substantially concentric and substantially annular seats. Extending between the seats are stays which form inlet openings therebetween.

Such a valve is described in Swedish Specification No. 73 13984-2. One disadvantage with this known valve is that it is sensitive to differences in temperature which can occur between the ambient air and the air in the pipe, these temperature differences being liable to cause condensation. When the valve is located in an unheated space the temperature, for example when draining away hot bath water, will become so high in the valve housing that condensation will be formed on the inside of said housing and will run down, through the inlet opening, along the outside of the pipe, possibly resulting in damage thereto. A worst, the condensation can collect around the movable valve means and freeze at low ambient temperatures, thereby rendering the valve unserviceable.

An object of the present invention is therefore to provide an improved valve of the type mentioned in the introduction, in which the aforementioned problems are totally eliminated.

Figure 2:
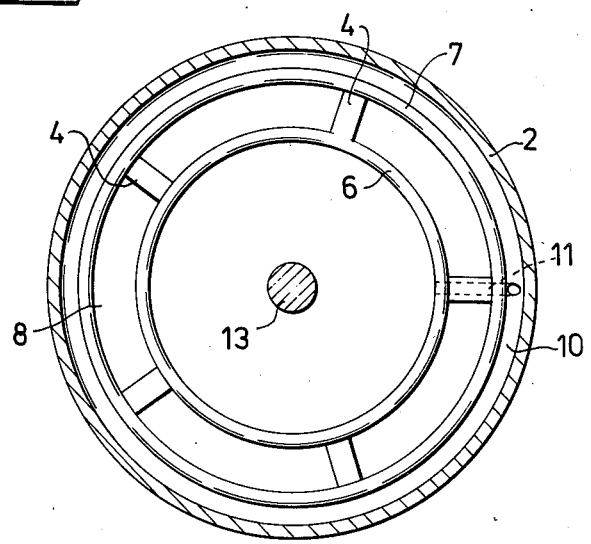
Figure 3:
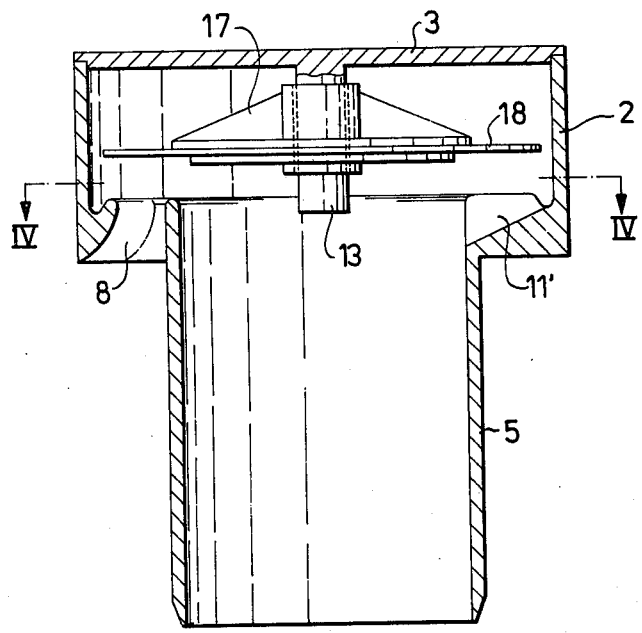
Figure 4:
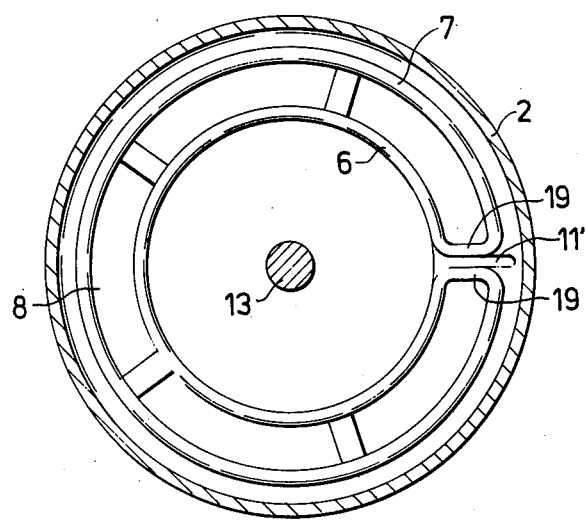

This object is realised in full by means of the present invention as defined in the accompanying claims and as described below with reference to the accompanying drawings, in which FIG. 1 is an axial sectional view of a ventilation valve according to the invention, FIG. 2 is a sectional view taken on the line II—II in FIG. 1, FIG. 3 is an axial sectional view of a modified embodiment, and FIG. 4 is a sectional view taken on the line IV—IV in FIG. 3.

FIGS. 1 and 2 illustrate a valve housing 1 comprising a cylinder 2 having a removable cap 3 which fits sealingly onto said cylinder. The cylinder is connected to a stub 5 by means of stays 4, said stub forming means for connecting the cylinder to a pipe (not shown) in which an underpressure occurs when flushing, for example, a water closet to a waste pipe (not shown).

At its side facing the cap 3, the stays connect with two concentric, annular seats 6 and 7. Located between the seats 6-7 is an air-inflow opening 8 which, in the illustrated embodiment, extends around the stub 5 and between the two seats 6,7. The part 2 of the valve housing, which part may be cylindrical as shown or of any other suitable configuration, is provided externally of the outer seating 7 with an annular bottom 9 in which a water-collecting, annular groove 10 is formed. At least one of the stays 4 is provided with a channel 11 which connects the bottom of the groove with the interior of the stub 5. Conveniently, the channel slopes downwardly from the groove 10 in order to facilitate draining of the water. In the illustrated embodiment, the channel or channels 11 also form a free connection between the interior of the stub 5 and the valve chamber 12 in the valve housing 1.

The cap 3 carries on its inner surface a guide peg 13 arranged concentrically with the seats 6,7.

Arranged on the peg 13 is a two-part hub 17 which is freely slideable along the peg and between the two parts of which there is firmly clamped an annular plate 18 of a flexible material, for example rubber, said plate being arranged in the closed position of the valve (FIGS. 1 and 2 illustrate the open position) to abut the seats 6 and 7, the annular sealing surfaces of which are located in a common plane. The hub 17 may also be manufactured as a one piece structure with an annular groove in which the inner edge of the valve means 18 can be arranged to rest.

When the plate-like valve means 18 abuts the seats 6,7 the valve chamber 12 is sealed against ambient air whilst the interior of the pipe communicating therewith is connected, through the pipe 5 or some other suitable connecting means, with the valve chamber 12 through the channel or channels 11. It is also possible to arrange one or more air-flow holes in the hub 17, although it is preferred to use one or more channels 11 for reasons hereinafter made apparent. When water is drained off, the pressure in the valve chamber 12 will be below the ambient pressure, whereby the valve means 18 and the hub 17 will be lifted up on the guide peg 13 and the ambient air acting on the underside of the valve means will flow into the valve chamber 12 and through the channel or channels 11, thereby to equalise the pressure in the interior of the pipe. Any condensation which has collected in the groove 10 and which has not previously run down via the channel or channels 11, will be drawn into the pipe. Since the channel or channels 11 can also be used to connect the valve chamber 12 with the pipe, whereby no specially arranged air openings are present, the channels 11 can be arranged horizontally if so desired, and the groove 10 will be positively emptied of condensation.

FIGS. 3 and 4 illustrate a modified ventilation valve. The main difference between the modified valve and the valve described above resides in the arrangement of outlet channels or the channels for the condensation. As will will be seen from the two figures, in this embodiment there is provided a groove 11' in at least one of the stays 4, and the seats 6,7 have been terminated with an intermediate wall 19 at said groove or grooves 11', thereby to provide the intended sealing. In other respects the ventilation value is the same as that illustrated in FIGS. 1 and 2.

The invention is not restricted to the described and illustrated embodiments, but can be modified within the scope of the following claims. For example, the plate-like valve member can be arranged for free rotation without being guided in any way, i.e. the hub 17 and peg 13 can be omitted.

I claim:

1. An air valve connectable to a pipe to relieve vacuum in said pipe while preventing escape of fluid therefrom, said valve including:
   a body having an inner chamber and air inlet means for communicating said inner chamber with the ambient atmosphere,
   said air inlet means including inner and outer concentrically spaced valve seats, an annular water collecting groove immediately surrounding said outer valve seat,
a valve element displaceably mounted in said inner chamber, said valve element being normally urged to a valve closed position and being shiftable to a valve open position in response to a vacuum in said pipe,
said valve element including an annular disc formed of an eleastic material with said disc having a diameter sufficient to engage said outer concentrically spaced valve seat when the valve element is in its closed position but insufficient to cover said annular water collecting groove surrounding said outer valve seat, and
a channel connecting said water collecting groove and said pipe so that when said valve element is in its closed position with said annular disc engaging said inner and outer concentrically spaced valve seats communication is maintained between said inner chamber and said pipe to permit transmission of vacuum to said inner chamber and water in said water collecting groove to said pipe.

2. The air valve of claim 1 in which stays are positioned in said air inlet means connecting said inner and outer concentrically spaced valve seats and said channel connecting said water collecting groove and the pipe is formed in one of said stays.

* * * * *